(12) United States Patent
Hefeeda et al.

(10) Patent No.: US 8,509,600 B2
(45) Date of Patent: Aug. 13, 2013

(54) COPY DETECTION

(75) Inventors: Mohamed M. Hefeeda, Doha (QA);
Nagmeh F. Khodabakhshi, Doha (QA)

(73) Assignee: Qatar Foundation, Doha (QA)

( * ) Notice: Subject to any disclaimer, the term of this patent is extended or adjusted under 35 U.S.C. 154(b) by 56 days.

(21) Appl. No.: 13/197,573

(22) Filed: Aug. 3, 2011

(65) Prior Publication Data

US 2013/0034337 A1 Feb. 7, 2013

(51) Int. Cl.
*H04N 9/80* (2006.01)

(52) U.S. Cl.
USPC ........... 386/252; 386/255; 386/257; 386/258; 386/259; 386/260

(58) Field of Classification Search
USPC .................. 386/252, 255, 257, 258, 259, 260
See application file for complete search history.

(56) References Cited

U.S. PATENT DOCUMENTS

| | | | | |
|---|---|---|---|---|
| 6,222,552 | B1* | 4/2001 | Haas et al. | 345/422 |
| 2011/0122255 | A1* | 5/2011 | Haritaoglu | 348/180 |
| 2012/0019520 | A1* | 1/2012 | Suzuki et al. | 345/419 |

OTHER PUBLICATIONS

Ramachandra, V. et al., "3D Video Fingerprinting," 3DTV Conference: The True Vision—Capture, Transmission and Display of 3D Video, IEEE, Piscataway, NJ, pp. 1-4 (May 28, 2008).
Kucuktunc, O. et al., "Video copy detection using multiple visual cues and MPEG-7 descriptors," Jnl of Visual Communication & Image Representation, Academic Press, Inc., vol. 21, No. 8, pp. 838-849 (Nov. 1, 2010).
Naghmeh, Khodabakhshi et al., "Copy Detection of 3D Videos," MMSys '12, pp. 131-142 (Feb. 24, 2012).

* cited by examiner

*Primary Examiner* — Daquan Zhao
(74) *Attorney, Agent, or Firm* — Mossman Kumar & Tyler PC

(57) ABSTRACT

A method for detecting whether query video data appears in a reference video, comprising determining a measure of depth from a portion of the query video data, comparing the measure against a measure of depth for the reference video to perform a depth match and, if a match is determined; comparing a visual signature derived from the query video data against a visual signature of the reference video to perform a visual match to determine a measure representing the likelihood that the query video data derives from the reference video.

19 Claims, 6 Drawing Sheets

COPY DETECTION

The present invention related to copy detection, and, in particular, to copy detection for 3D video.

BACKGROUND

A 3D (three-dimensional) video is one that is designed to enhance the illusion of depth perception. A camera system is typically used to record images from two perspectives (or computer-generated imagery generates the two perspectives in post-production), and special projection hardware and/or eyewear are used to provide the illusion of depth when viewing. Such 3D video content can include film theatrical releases, television broadcasts and online content.

With rapid advances in 3D cameras and displays, numerous 3D videos are expected to be created and consumed in the near future. The creation of 3D content is expensive—typically more so than the cost associated with two dimensional (2D) content. Accordingly, content owners are interested in protecting their contents from illegal copying and distribution in order to protect the investments being made.

SUMMARY

According to an example, there is provided a method for detecting whether query video data appears in a reference video, comprising determining a measure of depth from a portion of the query video data, comparing the measure against a measure of depth for the reference video to perform a depth match and, if a match is determined, comparing a visual signature derived from the query video data against a visual signature of the reference video to perform a visual match to determine a measure representing the likelihood that the query video data derives from the reference video.

Comparing a visual signature can include generating a visual signature for the query video, and comparing the visual signature against a measure of visual content of the reference video. In an example, the measure of depth represents 3D content of a video. Determining a measure of depth can include extracting a depth map from the query video data representing information relating to the distance of surfaces of scene objects from a viewpoint. In an example, comparing the measure can include comparing against multiple frames of a reference video. The multiple frames can represent different views for the reference video.

In an example, a method can further include computing a matching score representing a measure of distance between query video data and the reference data. The matching score can comprise first and components relating to first and second matching scores from a depth match and a visual match respectively. In an example, a matching score is determined using a distance threshold measure above which a matching score is set to a first value, and below which a matching score is set to a second value.

According to an example, there is provided a copy detection system for a 3D reference video, comprising an extraction engine to determine a measure of depth from a portion of query video data, a comparison engine to perform a depth match by comparing the measure against a measure of depth for the reference video and to perform a visual match by comparing a visual signature derived from the query video data against a visual signature of the reference video to determine a measure representing the likelihood that the query video data derives from the reference video.

The reference video can include reference video data including depth information representing information relating to the distance of surfaces of scene objects from a viewpoint. In an example, the comparison engine is further operable to determine a match for a portion of reference video over multiple frames of the reference video. The multiple frames can relate to multiple views for the reference video. The comparison engine can be operable to compare the measure of depth from the query video data to multiple depth measures from respective multiple reference videos, and further operable to generate a matching score representing a measure of similarity between the query video data and a reference video. The matching score can include components representing a measure for the depth match and for the visual match performed by the comparison engine.

In an example, the system is further operable to locate the position, within the reference video, of matching portion of query video data.

According to an example, there is provided a computer program embedded on a non-transitory tangible computer readable storage medium, the computer program including machine readable instructions that, when executed by a processor, implement a method for detecting copied portions of a reference video, comprising determining a measure of depth from a portion of query video data, comparing the measure against a measure of depth for the reference video to perform a depth match and, if a match is determined, comparing a visual signature derived from the query video data against a visual signature of the reference video to perform a visual match to determine a measure representing the likelihood that the query video data derives from the reference video.

Determining a measure of depth can include using an existing depth map or deriving a depth map from existing video data for the reference video or query video data.

BRIEF DESCRIPTION OF THE DRAWINGS

An embodiment will now be described, by way of example only, and with reference to the accompanying drawings, in which.

DETAILED DESCRIPTION

The success of the Internet and the widespread availability of cost-effective digital storage devices have made it possible to replicate, transmit, and distribute digital content such as video in an effortless way. The protection of Intellectual Property Rights (IPR), especially with respect to copyrights of digital video content, has become an important issue. In particular, detecting copies of digital media (images, audio and video) is a basic requirement for those investigating possible counterfeiting.

There are typically two approaches which can be used to protect digital content: watermarking and content-based copy detection. As is generally known, watermarking embeds known information in content prior to distribution. Thus, copies of marked content contain the watermark, which can later be extracted and used to prove the existence of copied material. For content-based copy detection, additional information beyond the content itself is not required. Typically, a video contains enough unique information that can be used for detecting copies. For example, if an owner of a video suspects that the video content is being illegally distributed or hosted on the Internet, the owner can pose a query to a copy detection system which can perform a comparison to determine if a copy is present. It will be appreciated that the content-based copy detection can also be a complementary approach to watermarking. After a suitable copy detector provides a creator or a distributor with a suspect list, the actual owner of the media can use a watermark or other authentication techniques to prove ownership for example.

Content-based copy detection schemes typically extract signatures from original content. The same signature, extracted from query content—that is, content which it is desired to compare against original content and which may be counterfeit or copied for example—is compared to the original signature to determine if the query content is a copy of the original.

Figure 1:
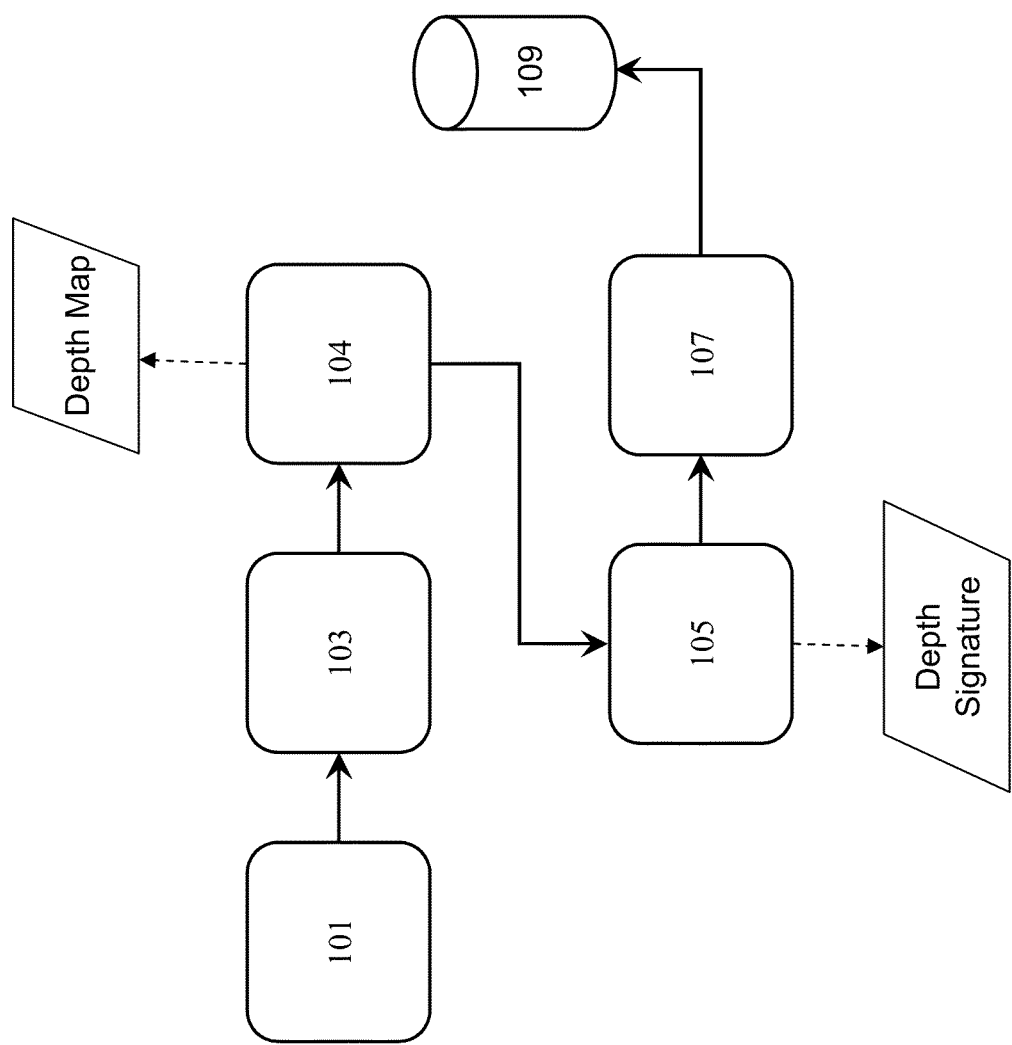
FIG. 1 is a schematic block diagram of a method according to an example.

According to an example, 3D video content has an extra layer of useful information in the form of depth information which can be extracted and used in a process to determine if some 3D video content is copied. FIG. 1 is a schematic block diagram of a method according to an example. Data for a reference video 101 which represents an original video including 3D content is processed in block 103 in order to extract depth information in the form of a depth map 104. For example, a measure of depth from a portion of the reference video data representing 3D content can be extracted. In an example, a depth map provides a representation of information relating to the distance of surfaces of scene objects from a particular viewpoint, such as a camera for example.

Different methods exist for preparing and coding 3D videos, including:
  Stereo video in which a video has two views. A view can be thought of as a separate 2D video stream.
  Multi-view video in which a video has multiple views, a subset of which are displayed to the user depending on the angle of viewing.
  Video plus depth, in which a video is encoded in 2D and a separate depth map is created. The depth map allows the creation of many virtual (synthesized) views, which can add flexibility and support wider viewing angles for users for example.

Combinations and modifications of the above methods are possible. For example, a 3D video can be encoded in multi-view plus depth, where several views are used with a depth map to create more virtual views.

For 3D videos encoded in video plus depth format (or its variants), depth information for each video frame is typically represented as a grayscale image showing the depth of each pixel in that video frame. That is, a difference in gray level of a pixel compared to others represents a difference in depth for those pixels in the image, or rather a difference in depth for the underlying structure making up the image at those pixel locations. Such depth information can be used in order to provide a depth map for the frame.

For 3D videos encoded in stereo or multi-view formats, where no depth information is explicitly given, a method for estimating depth information to provide a depth map based on stereo matching for example can be used. More specifically, human eyes are typically horizontally separated by about 50-75 mm depending on each individual. Consequently, each eye has a slightly different view of the world. This difference between points of projection in the two eyes is called binocular disparity. Similarly, disparity between a stereo pair of images can be used to extract the depth information since the amount of disparity is inversely proportional to the distance from the observer. Therefore, according to an example, generating disparity images can be performed by taking two or more images and estimating a 3D model of the underlying scene for those images by finding corresponding pixels in the images and converting their 2D positions into 3D depths. A grayscale image can be used to represent a depth map determined using such a method as before.

For video content, depth information can be extracted from a single frame, or equivalent, or consecutively over several frames forming a portion of video content. In the former case, the depth information is typically in the form of a grayscale image. In the latter case, the depth information can be in the form of a set of grayscale images in which case the multiple such pieces of depth information can be combined in any suitable way in order to provide a single measure for the depth information over the portion in question. If a single video frame comprises a pair of images which are used to form a 3D image frame for consumption, each image from the stereo pair may provide depth information. As such, the information may then be combined into a single grayscale image such as by addition, subtraction or any other suitable method for combining the information from the images.

In block 105, depth information which has been extracted from video data representing a reference video is used to generate a depth signature for the reference video as will be explained below. In block 107, the depth signature is indexed in a signature database 109. For example, the generated depth signature can be indexed and stored with other depth signatures from other reference videos in order to form a repository of such signatures for a collection of reference videos, and which can be queried in order to compare signatures as will be explained below. According to an example, a reference video herein is an original video. Videos that are checked against reference videos are query videos herein. If a query video matches one of the reference videos, that query video is called a copied video herein. Other alternatives are possible.

Figure 2:
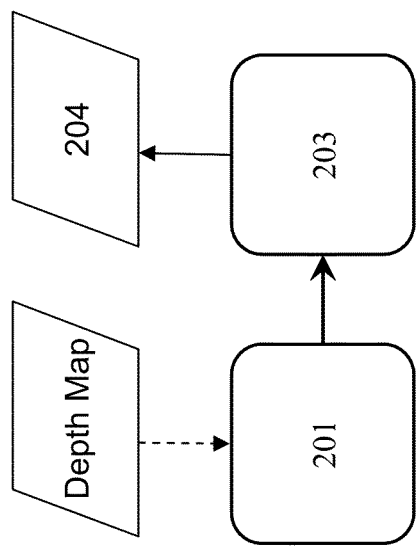
FIG. 2 is a schematic block diagram of a method for generating a depth signature according to an example.

FIG. 2 is a schematic block diagram of a method for generating a depth signature according to an example. In block 201, depth map 104 is divided into a grid. The division into a grid can be uniform, i.e., into equal size blocks, or non-uniform to account for different importance in regions in the depth map. For example, salient image portions can be segmented differently to account for their relative importance compared to non-salient regions in a frame. The level of granularity of segmentation can be finer over salient portions of a depth map. According to an example, the number of blocks in a grid is a configurable parameter which trades off computational complexity with copy detection accuracy. The number can be determined automatically, such as based on a measure of saliency for example, or can be a manually provided number.

In block 203, segmented blocks of the depth map 104 grid are mapped to a vector 204. According to an example, each element of the vector can represent one block, although groups of blocks may map to one vector element. For example, a group of non-salient segments may be combined in a suitable way and mapped to one or more elements of a vector, thereby reducing the number of dimensions of the vector.

Various metrics can be used to map the depth information. For example, the mean, mode, or median of the depth values in a segment can be used as a measure for the block in question with that value being mapped to the vector. More complex metrics that are composed of multiple components, e.g., the mean and standard deviation, can also be used. The vector 204 takes the form $<d_1, d_2, \ldots d_i, \ldots, d_D>$ in an example, where D is the total number of blocks in the depth map grid, and $d_i$ is a metric summarizing the depth information in block i.

According to an example, a depth signature can be created for every frame in a video. It can also be created for only a subset of the frames in order to reduce the computational complexity. This subset of the frames can be chosen deterministically, e.g., each $10^{th}$ frame is chosen, or randomly. In addition, the subset of the frames can be keyframes of the video, where a keyframe is a representative frame for a sequence of video frames containing similar visual information, which is referred to as a video shot. Typically, shot boundary detection algorithms can be employed to identify when a shot starts and ends. Known keyframe selection algorithms can be used to select key frames.

According to an example, the depth signature for a video is composed of the depth signatures of its frames, or the chosen subset of frames for which the depth signatures are created. In the case of multiple vectors, the depth signature can be formed by concatenating the vectors for example. Alternatively, the metrics summarizing respective blocks can be grouped in the signature to provide a signature of the form $<d^1_1, d^1_2, \ldots d^j_i, \ldots, d^m_D>$, where, over m frames, D is the total number of blocks in the depth map grid, $d^j_i$ is the metric summarizing the depth information in block i of frame j.

Similarly to the above, depth signatures can be generated for other videos other than reference videos. That is to say, a query video which is a candidate copy of a reference video and which it is desired to compare against reference videos can be processed in order to generate a depth signature for it.

Accordingly, depth signatures, which are vectors with multiple dimensions, can be compared against depth vectors from other videos in order to find potential copies. According to an example, depth signatures are indexed in order to facilitate such comparisons. In particular, given a depth vector from a query video finding the closest matching depth signatures from the reference video database provides a way of determining if a query video is a copy. Multiple methods can be used to achieve this nearest neighbour search efficiently, including but not limited to locality sensitive hashing (LSH) for example. Typically, when using LSH, the basic premise is to hash high dimensional vectors to integer hash values in such a way so that when the vectors are 'close' to each other in the original space, their hash values are likely to be close to each other as well.

LSH employs a family of hash functions, which are denoted H={S→U}, where S is the set of input points and U is the set of hash values. A hash function h∈H is called $(r_1, r_2, p_1,)$ sensitive for a distance measure D, which can be Euclidean distance, if for any v,q∈S:

$$v \in B(q, r_1) \text{ then } Pr_H[h(v)=h(q)] \geq p_1$$

$$v \notin B(q, r_2) \text{ then } Pr_H[h(v)=h(q)] \leq p_2,$$

where $B(q,r_1)$ is a sphere of radius $r_1$ centered at q. For the hash function to be useful, $r_1<r_2$, and $p_1<p_2$. Usually, to amplify the gap between $p_1$ and $p_2$, several functions are used and the output hashes are concatenated. In other words, a new family of functions are defined as $G=\{g:S \to U^k\}$, $g(v)=(h_1(v), h_2(v), \ldots, h_k(v))$, where $h_i \in H$. Then, L functions from the G family are chosen independently and uniformly at random for the hashing.

One of the locality sensitive hash families that can be used is based on s-stable distributions, where each hash function maps a d-dimensional vector v to an integer using the following:

$$h_{a,b}(v) = \left\lfloor \frac{a \cdot v + b}{w} \right\rfloor,$$

where a is a d-dimensional vector with entries chosen independently from an s-stable distribution, and b is a real number chosen uniformly from the range [0, w]. The parameter w depends on the desired distance between the query and nearest points, and the distance measure.

In order to index depth signatures, the following steps are performed according to an example:

Choose L functions from the G family: $g_j(v), j=1, L, \ldots, L$
    Consider each depth signature, which corresponds to a video frame, as one data point v
    Create an index
    Apply the functions on v. The result is L entries in various buckets of the index. Each entry in a bucket has the following fields:
    <VideoID,FrameID,ViewID,DepthSignature>
    To find nearest neighbours of a query depth signature, the entries of the L buckets of its L hashed values are searched, and points close to the query depth signature are returned.

Figure 3:
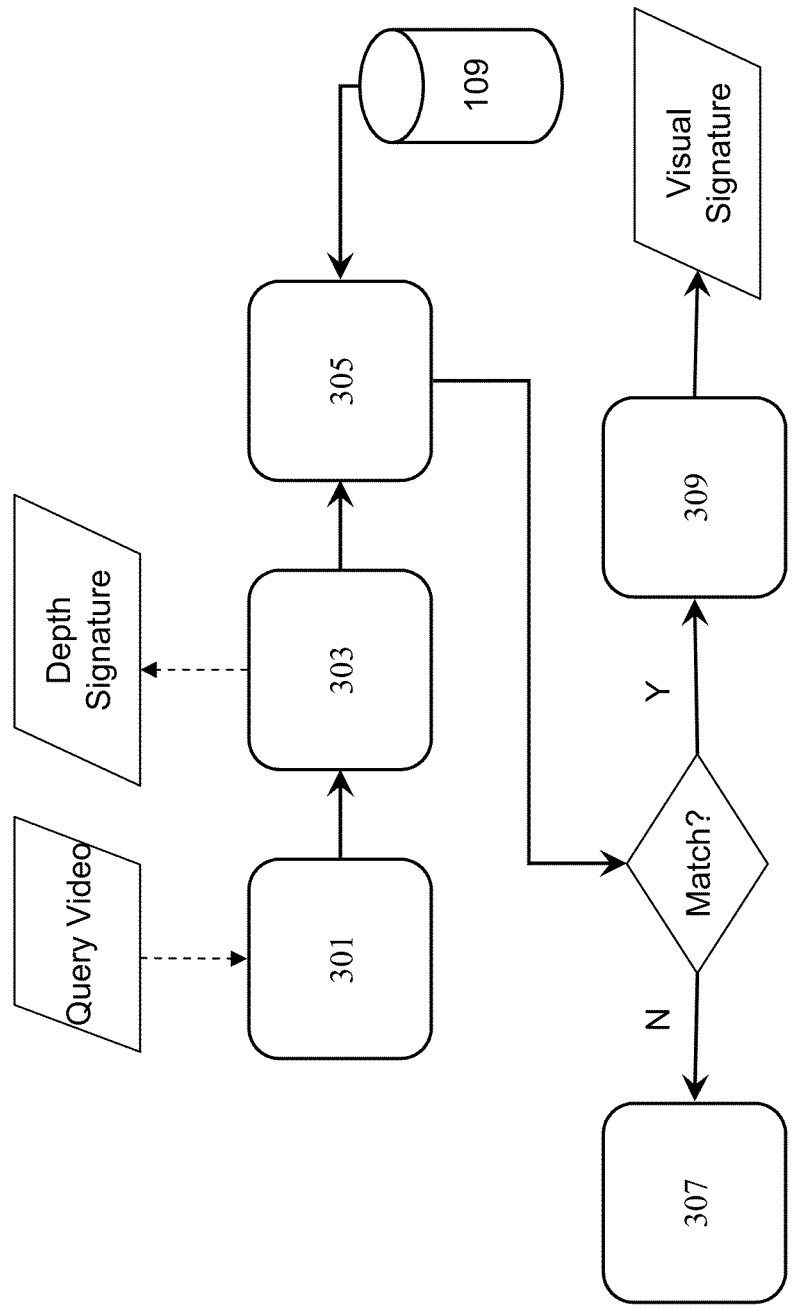
FIG. 3 is a schematic block diagram of a method for detecting whether query video data appears in a reference video according to an example.

FIG. 3 is a schematic block diagram of a method for detecting whether query video data appears in a reference video according to an example. In block 301 depth information for a query video is extracted, and a depth signature as described above is generated in block 303. The depth signature for the query video is compared against depth signatures in the signature database 109 in block 305 (described in more detail below). If a match is not found, the process ends in block 307. If a match is found, a visual signature for the query video is generated in block 309.

Typically, visual features should be robust to (i.e. they should not change because of) various transformations such as scaling, rotation, change in viewpoint, and change in illumination for example. Different types of visual features can be used, including but not limited to SURF (Speeded Up Robust Feature) and SIFT (Scale-Invariant Feature Transform).

According to an example, SIFT features can be extracted from a video frames as follows:

Scale-space extrema detection: Search over all scales and image location (using a difference-of-Gaussian function) to identify potential interest points that are invariant to scale and orientation.
    Keypoint localization: Candidate locations for keypoints are selected based on measures of their stability.
    Orientation assignment: One or more orientations are assigned to each keypoint location based on local image gradient direction (All future operations are performed on the image based on the assigned orientation, scale, and location for each feature, so the features are invariance to these transformations).
    Keypoint descriptor: Local image gradients are measured at the selected scale in the region around each keypoint. Then, these are transformed into a representation that allows significant levels of local shape distortion and change in illumination. The descriptor for each keypoint is usually a 128-element vector.

The number of visual features extracted from each video frame can be controlled by configuring a feature extraction algorithm. Reducing the number of extracted features results in a reduction of the computational complexity, but might introduce some errors in the detection process. For SIFT features, the peak threshold and edge threshold parameters of the SIFT feature extraction algorithm are set to control the number of SIFT features. In one example, the number of SIFT features extracted from each frame can be set to around 200.

The visual signature for a video frame takes the form $<v_1, v_2, \ldots, v_i, \ldots, v_V>$, where V is the total number visual features in a frame, and $v_i$ is the value of visual feature i. Each visual feature $v_i$ has multiple elements. For example, a SIFT feature typically has 128 elements.

Similar to the depth signature, the visual signature can be created for every frame in the video. It can also be created for only a subset of the frames in order to reduce the computational complexity. This subset of the frames can be chosen deterministically, e.g., each $10^{th}$ frame is chosen, or randomly. In addition, the subset of the frames can be the keyframes of the video, where a keyframe is a representative frame for a sequence of video frames containing similar visual information, which is referred to as a video shot. The visual signature of a video is composed of the visual signatures of its frames, or the chosen subset of frames for which the visual signatures are computed.

A set of visual signatures for reference videos is generated and stored in the signature repository 109. Accordingly, in block 111 the visual signature of a query video is compared against the visual signatures of reference videos stored in the repository 109. If a match is not found, the process ends at block 113. If a match is found, a score representing the match along with other data such as an identification of the query video and/or an identification of the matching portion is returned in block 115.

According to an example, and similarly to depth indexing, visual signatures can be hashed into L' buckets, with an entry stored for it in each bucket. Such an entry has the following fields according to an example: <VideoID,FrameID,ViewID, FeatureID, VisualSignature>. To find nearest neighbours of a query visual signature, the entries of the L' buckets of its hashed values are searched.

Accordingly, a depth signature is first computed from a query video. The methods used to extract depth information and create depth signatures are the same as the ones used to process reference videos as described above. The depth signature of the query video is then compared against the depth signatures in the repository 109, which can store signatures for reference videos in the form of a database. If there is no match, the query video is not considered for any further processing. If a match occurs, a visual signature is computed from the query video and compared against visual signatures in the reference video database 109. A combined score is then computed based on a depth signature matching score as well as a visual signature matching score. The combined score is used to decide whether the query video is a copy of one of the videos in the reference video database.

This method is computationally efficient as it eliminates many query videos by checking their depth signatures first, which are typically more compact and faster to compare than visual signatures. Since modifications to the depth values of copied videos can damage depth perception and create undesirable visual artefacts, which means that they are unlikely to be performed on copied videos, the loss in the copy detection accuracy in this method is not significant.

According to an example, depth and visual signatures can be extracted from a query video. Then, both the depth and visual signatures can be compared against the signatures in the reference database 109 and a combined matching computed, which can then be used to determine whether the query video is a copy or not. This method requires more computations, but it can tolerate depth transformations applied to the copied videos.

If a query video is found to be a potential copy of a reference video or part of it, the location of the copied part in the reference video can be identified.

According to an example, determining potential copied query videos using depth signatures can take place in steps: frame level comparison; and video level comparison. In one step, the best matching frames in the signature database 109 for each query frame are determined and a score between each matched pair is computed. In another step, the temporal aspects of the video frames can be taken into account, and a matching score between a query video and each reference video can be computed.

Accordingly, for each depth signature of the query video, the depth signatures that are closest to it based on a measure, such as Euclidean distance, can be found using a nearest neighbour search method such as LSH. For example, if LSH is used, the L buckets of the hashed values of the depth signature of the query video frame are identified. Then, the distances between the query depth signature and all depth signatures are computed. According to an example, distances can be used as matching scores. Alternatively, a threshold can be used such that scores for distances exceeding the threshold can be set to zero and other scores are set to 1 for example. This can reduce the computation needed to compare scores. It should be noted that frames found in this may belong to different videos.

In addition, 3D videos can have multiple views, and a signature from the query frame should be checked against frames from different views.

Figure 4:
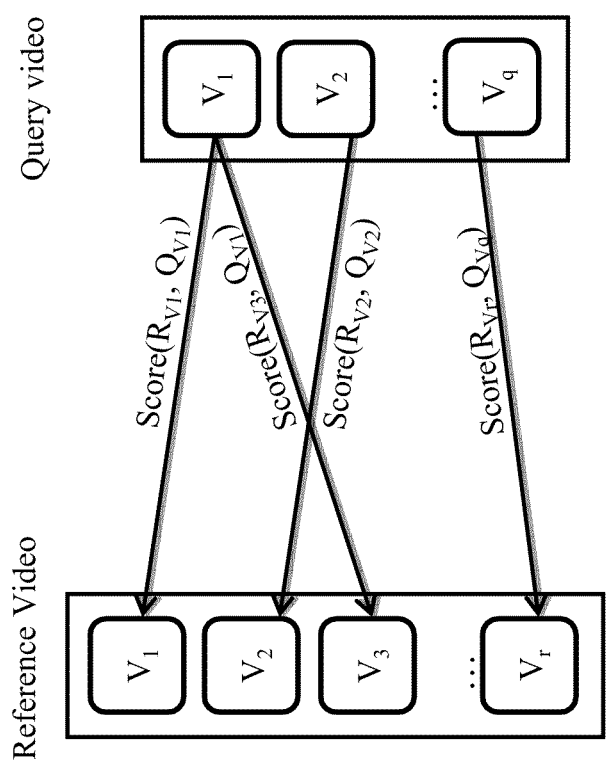
FIG. 4 is a diagram depicting a general case in which query and reference videos have multiple views.

FIG. 4 is a diagram depicting a general case in which query and reference videos have multiple views. As such, q views in the query video and r views in the target video are matched against each other. Two frames are considered a match if at least one of their views matches. Finally, a score can be computed for each matched pair of frames based on the distance between their views. For example, the score can be the number of views that match. The number of matched frames in each reference video can then be counted. Reference videos with the number of matched frames exceeding a threshold can be considered in a subsequent step, with other videos no longer considered.

If a number of matched frames exceeds a threshold, the temporal characteristics of the videos can then be taken into account. Temporal characteristics include the timing and order of the frames in the query and reference videos. For example, if frame x in a query video matches frame y in a reference video, then frame x+1 in the query video should match frame y+1 in the reference video. Copied videos are typically clips with contiguous frames taken from reference videos. Also, a copied video can be embedded in other videos.

Figure 5:
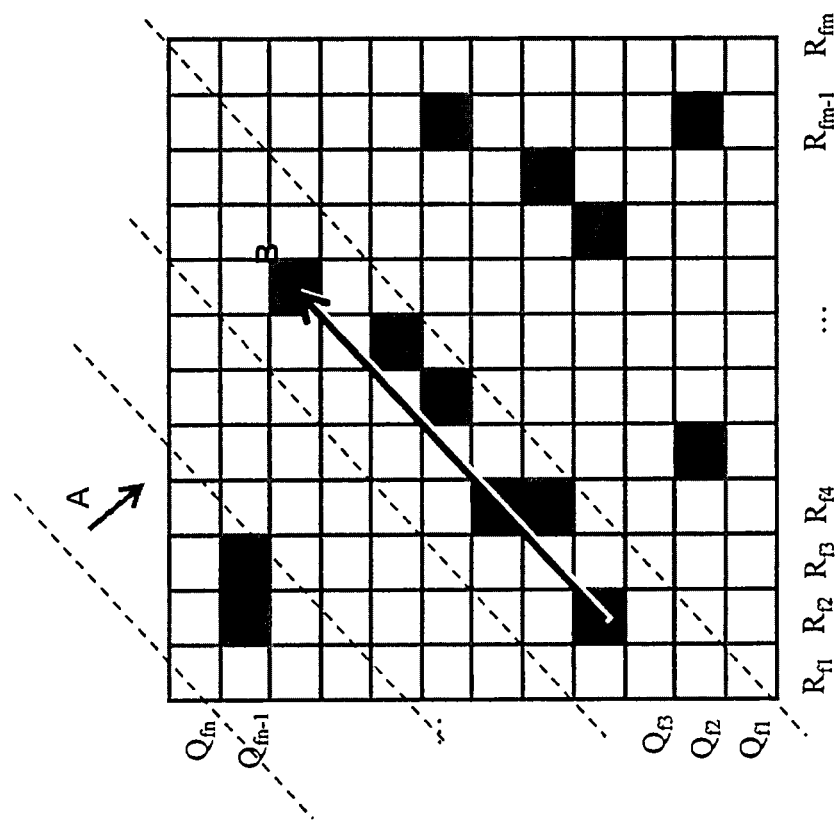
FIG. 5 is a diagram depicting a method according to an example.

In order to consider temporal characteristics, a matching matrix is computed for each candidate reference video and the query video according to an example. The columns of the matrix represent reference video frames, and the rows represent query video frames. Entries in the matrix are the relevance scores of the frames. FIG. 5 is a diagram of a matching matrix according to an example, in which dark squares represent matched frames. According to an example, the longest diagonal sequence in the matrix with the largest number of matching frames is considered as a potential copy. The number of matched frames is referred to as the depth matching score and is denoted by $S_{depth}$.

It is worth mentioning that frame dropping and occasional frame mismatches caused by possible transformations must be taken into account. Thus, the diagonal sequence mentioned before is not a strictly linear one, and gaps may exist. To find the longest diagonal sequence with the greatest score, instead of considering a line of frames, a band with a specific width is considered, as shown in FIG. 5, which is a diagram depicting a method according to an example. This band, depicted by dashed diagonal lines, starts sweeping the matrix from top left most position and moves one block each time in the direction shown by arrow A. At each position of this band, the temporal score of the longest diagonal sequence of matched frames inside the band is computed. After performing this process for all the positions, the position with the greatest temporal score is considered the potential copied location, and its score is considered the temporal score of the reference video. For example, the arrow B in FIG. 5 shows the longest diagonal sequence of for the example matrix.

Similarly to depth signature comparison, visual signatures comparison can occur in steps: frame level, and video level. For each query frame visual signature, the visual signatures that are closest to it based on a measure such as Euclidean distance are detected using a nearest neighbour search method such as LSH. For example, if LSH is used, the L' buckets of the hashed values of the visual signature vector $<v_1, v_2, \ldots, v_{L'}>$ are searched and entries in the form <VideoID,FrameID,ViewID,FeatureID,DepthSignature> are returned. These features may belong to different frames of different videos. Accordingly, to find the matching keyframes, the number of times that features of a frame are returned is counted, and the frames with the greatest count are considered a match. Then, keyframe level matching can be performed, similarly to the process for depth signatures as described above.

At the video level comparison, such as for depth video level matching, temporal characteristics are taken into account, and a temporal score is computed between the query video and each potential reference video. Finally, the videos which best match based on their temporal scores are considered as potential copies.

According to an example, a final matching is computed for each potential video based on the depth and visual matching scores, using a weighted sum:

$$Score = w_1 S_{depth} + w_2 S_{visual}.$$

Typically, visual scores are more accurate than depth scores, and therefore, according to an example, a larger weight ($w_2$) can be applied to the visual score component. A weighting applied to the depth component is $w_1$.

As mentioned above, copied videos can be small clips of a reference video. It is therefore useful to automatically identify the location of a copied clip in the reference video. According to an example, the matching matrix shown in FIG. 5 can be used to identify the location of the copied clip. Note that there will be two matching matrices: one from matching depth signatures and the other from matching visual signatures. Either one of them or both can be used. Typically, the longest diagonal sequence with the greatest score in each case is determined. The start and end of this longest sequence provides the start and end locations of the clip in the reference video which has been copied in the query video.

Using both of depth and visual matching matrices can yield more accurate locations of the copied clips. In this case, the intersection of the two sequences returned from comparing depth and visual signatures is used to mark the start and end location of in the reference video.

Figure 6:
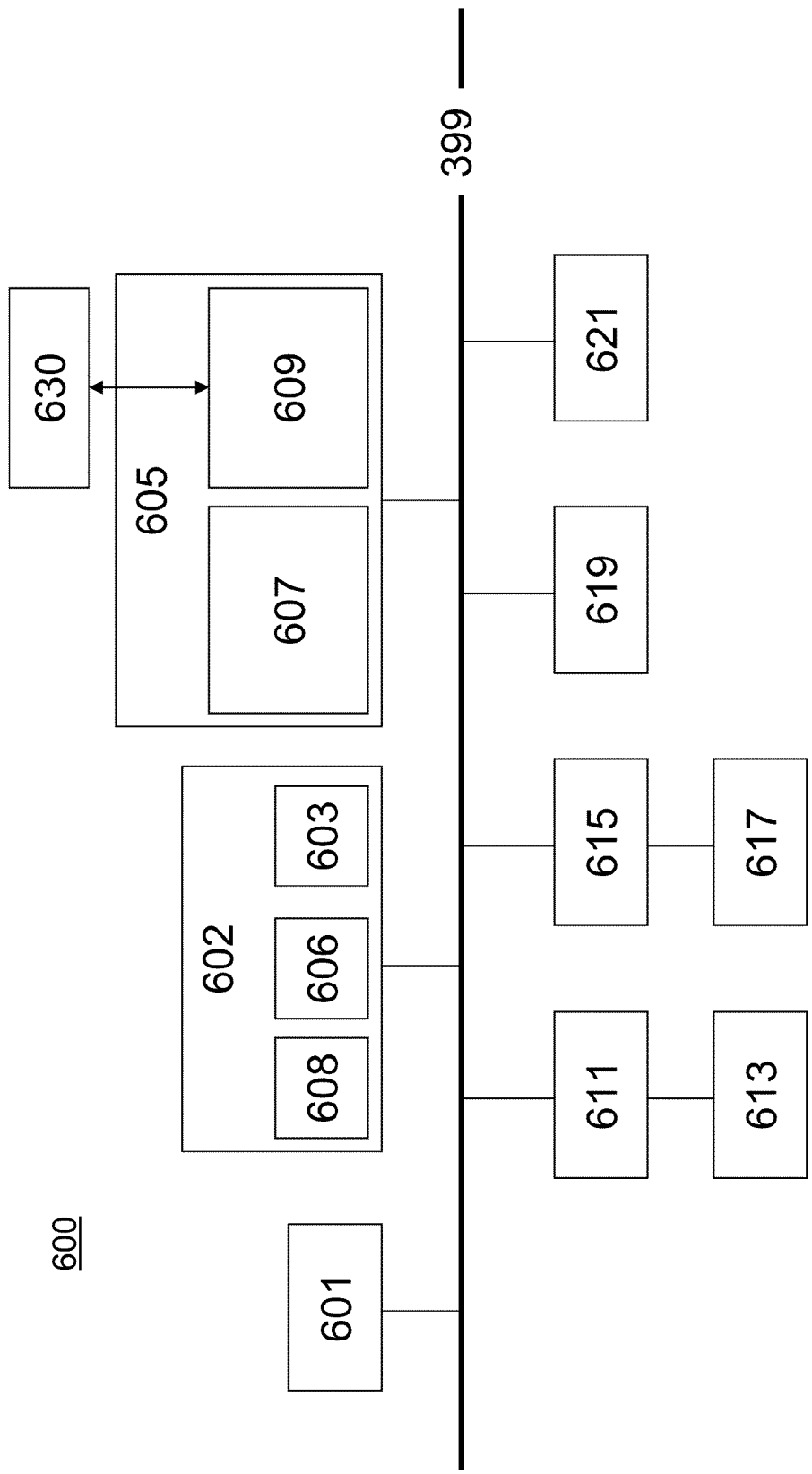
FIG. 6 is a schematic block diagram of a copy detection system according to an example.

FIG. 6 is a schematic block diagram of a copy detection system according to an example. Apparatus 600 includes one or more processors, such as processor 601, providing an execution platform for executing machine readable instructions such as software. Commands and data from the processor 601 are communicated over a communication bus 399. The system 600 also includes a main memory 602, such as a Random Access Memory (RAM), where machine readable instructions may reside during runtime, and a secondary memory 605. The secondary memory 605 includes, for example, a hard disk drive 607 and/or a removable storage drive 630, representing a floppy diskette drive, a magnetic tape drive, a compact disk drive, etc., or a non-volatile memory where a copy of machine readable instructions or software may be stored. The secondary memory 605 may also include ROM (read only memory), EPROM (erasable, programmable ROM), EEPROM (electrically erasable, programmable ROM). In addition to software, data representing any one or more of video data, such as query or reference video data, depth information such as data representing a depth map for example, and data representing visual or depth signatures may be stored in the main memory 602 and/or the secondary memory 605. The removable storage drive 630 reads from and/or writes to a removable storage unit 609 in a well-known manner.

A user interfaces with the system 600 with one or more input devices 611, such as a keyboard, a mouse, a stylus, and the like in order to provide user input data. The display adaptor 615 interfaces with the communication bus 399 and the display 617, and receives display data from the processor 601 and converts the display data into display commands for the display 617. A network interface 619 is provided for communicating with other systems and devices via a network (not shown). The system can include a wireless interface 621 for communicating with wireless devices in the wireless community.

It will be apparent to one of ordinary skill in the art that one or more of the components of the system 600 may not be included and/or other components may be added as is known in the art. The system 600 shown in FIG. 6 is provided as an example of a possible platform that may be used, and other types of platforms may be used as is known in the art. One or more of the steps described above may be implemented as instructions embedded on a computer readable medium and executed on the system 600. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

According to an example, data 603 representing a visual and/or depth signature can reside in memory 602. An extraction engine 606 and a comparison engine 608 can be modules executed from memory 602 for example. Alternatively, engines 606, 608 can be ASICs or similar which can be connected to bus 399. A database 109 can reside on a HDD such as 605, or can be provided on a removable storage unit 609 for example.

What is claimed is:

1. A method for detecting whether query video data appears in a reference video, comprising:
    determining a measure of depth from a portion of the query video data; and
    comparing the measure against a measure of depth for the reference video to perform a depth match and, if a match is determined, comparing a visual signature derived from the query video data against a visual signature of the reference video to perform a visual match to determine a measure representing the likelihood that the query video data derives from the reference video.

2. A method as claimed in claim 1, wherein comparing a visual signature includes:
    generating a visual signature for the query video; and
    comparing the visual signature against a measure of visual content of the reference video.

3. A method as claimed in claim 1, wherein the measure of depth represents 3D content of a video.

4. A method as claimed in claim 1, wherein determining a measure of depth includes extracting a depth map from the query video data representing information relating to the distance of surfaces of scene objects from a viewpoint.

5. A method as claimed in claim 1, wherein comparing the measure includes comparing against multiple frames of a reference video.

6. A method as claimed in claim 5, where the multiple frames represent different views for the reference video.

7. A method as claimed in claim 1, further comprising computing a matching score representing a measure of distance between query video data and the reference data.

8. A method as claimed in claim 7, further comprising computing a matching score representing a measure of distance between query video data and the reference data, wherein the matching score comprises first and components relating to first and second matching scores from a depth match and a visual match respectively.

9. A method as claimed in claim 7, further comprising computing a matching score representing a measure of distance between query video data and the reference data, wherein a matching score is determined using a distance threshold measure above which a matching score is set to a first value, and below which a matching score is set to a second value.

10. A copy detection system for a 3D reference video, comprising:
    one or more processors providing an execution platform including copy detection modules, the modules comprising:
        an extraction engine to determine a measure of depth from a portion of query video data; and
        a comparison engine to perform a depth match by comparing the measure against a measure of depth for the reference video and to perform a visual match by comparing a visual signature derived from the query video data against a visual signature of the reference video to determine a measure representing the likelihood that the query video data derives from the reference video.

11. A copy detection system as claimed in claim 10, wherein the reference video comprises reference video data including depth information representing information relating to the distance of surfaces of scene objects from a viewpoint.

12. A copy detection system as claimed in claim 10, wherein the comparison engine is operable to determine a match for a portion of reference video over multiple frames of the reference video.

13. A copy detection system as claimed in claim 10, wherein the comparison engine is operable to determine a match for a portion of reference video over multiple frames of the reference video, and wherein the multiple frames relate to multiple views for the reference video.

14. A copy detection system as claimed in claim 10, wherein the comparison engine is operable to compare the measure of depth from the query video data to multiple depth measures from respective multiple reference videos.

15. A copy detection system as claimed in claim 10, wherein the comparison engine is operable to generate a matching score representing a measure of similarity between the query video data and a reference video.

16. A copy detection system as claimed in claim 15, wherein the comparison engine is operable to generate a matching score representing a measure of similarity between the query video data and a reference video, and wherein the matching score includes components representing a measure for the depth match and for the visual match performed by the comparison engine.

17. A copy detection system as claimed in claim 10, wherein the comparison engine is operable to locate the position, within the reference video, of matching portion of query video data.

18. A computer program embedded on a non-transitory tangible computer readable storage medium, the computer program including machine readable instructions that, when executed by a processor, implement a method for detecting copied portions of a reference video, comprising:
    determining a measure of depth from a portion of query video data; and
    comparing the measure against a measure of depth for the reference video to perform a depth match and, if a match is determined, comparing a visual signature derived from the query video data against a visual signature of the reference video to perform a visual match to determine a measure representing the likelihood that the query video data derives from the reference video.

19. A computer program embedded on a non-transitory tangible computer readable storage medium as claimed in claim 18, the computer program including machine readable instructions that, when executed by a processor implement a method for detecting copied portions of a reference video, wherein determining a measure of depth includes using an existing depth map or deriving a depth map from existing video data for the reference video or query video data.

* * * * *